US012625542B2

(12) United States Patent 
Ali et al.

(10) Patent No.: US 12,625,542 B2 
(45) Date of Patent: May 12, 2026

(54) MINIMIZING POWER CONSUMPTION FOR PERFORMING A WORKLOAD

(71) Applicant: Dell Products L.P., Round Rock, TX (US)

(72) Inventors: Rizwan Ali, Cedar Park, TX (US); Dharmesh M. Patel, Round Rock, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/735,774

(22) Filed: Jun. 6, 2024

(65) Prior Publication Data

US 2025/0377711 A1     Dec. 11, 2025

(51) Int. Cl. 
*G06F 1/329* (2019.01) 
*G06F 9/48* (2006.01)

(52) U.S. Cl. 
CPC ............ *G06F 1/329* (2013.01); *G06F 9/4893* (2013.01)

(58) Field of Classification Search 
CPC ......... G06F 1/324; G06F 1/329; G06F 9/4893 
USPC ................................................. 713/322, 100 
See application file for complete search history.

(56) References Cited

U.S. PATENT DOCUMENTS 5,628,619 A * 5/1997 Wilson .............. A61M 5/14232 
604/67 
7,382,366 B1 * 6/2008 Klock ..................... G06F 11/24 
714/E11.154

8,644,769 B2 * 2/2014 Ng ........................ G06F 1/3203 
455/574 
10,791,168 B1 9/2020 Dilley 
11,836,031 B2 * 12/2023 Hauke ..................... G06F 1/324 
12,135,629 B2 11/2024 Patel 
12,248,357 B1 * 3/2025 Ahmad .................. G06N 20/00 
2003/0196126 A1 * 10/2003 Fung ..................... G06F 1/3203 
713/300 
2004/0081045 A1 * 4/2004 Won ........................ G11B 19/00 
369/47.33 
2004/0260416 A1 * 12/2004 Kellom ............... H03F 3/45475 
700/94 
2005/0153702 A1 * 7/2005 Cuffaro .................. H04W 16/10 
455/452.1

(Continued)

*Primary Examiner* — Paul R. Myers 
(74) *Attorney, Agent, or Firm* — WOMBLE BOND DICKINSON (US) LLP

(57) ABSTRACT

Methods and systems for managing a data processing system are disclosed. To manage the data processing system, a workload request may be obtained, and a type of the workload may be identified. Based on the type of the workload, an optimized frequency for a hardware component to perform the workload and a power overhead for configuring the hardware component based on the optimized frequency may be obtained. A first power consumption estimate may be obtained for performing the workload during an available time slot, and configuring the hardware component based on the optimized frequency. A second power consumption estimate may be obtained for performing the workload without configuring the hardware component. A preferred configuration for the available time slot to minimize power consumption may be identified. A data processing system and a time slot for performance of the workload may be selected in which the power consumption estimate is lowest.

20 Claims, 6 Drawing Sheets

(56) References Cited

U.S. PATENT DOCUMENTS

| | | | | |
|---|---|---|---|---|
| 2006/0035674 A1* | 2/2006 | Karaoguz | ............ | H04B 7/0617 |
| | | | | 455/562.1 |
| 2006/0239368 A1* | 10/2006 | Hwang | ............... | H04L 27/2676 |
| | | | | 375/260 |
| 2006/0258927 A1* | 11/2006 | Edgar | ................ | A61B 5/14551 |
| | | | | 600/323 |
| 2008/0046023 A1* | 2/2008 | Fischell | ............. | A61N 1/36185 |
| | | | | 607/45 |
| 2008/0172567 A1* | 7/2008 | Zhang | .................. | G06F 1/3221 |
| | | | | 713/323 |
| 2010/0058086 A1* | 3/2010 | Lee | ....................... | G06F 1/3203 |
| | | | | 713/322 |
| 2011/0010567 A1* | 1/2011 | Schmitz | ............... | G06F 1/3203 |
| | | | | 713/300 |
| 2011/0072412 A1* | 3/2011 | Hasslen | ................. | G06F 30/33 |
| | | | | 717/106 |
| 2012/0060024 A1* | 3/2012 | Jackson | ............... | G06F 1/3265 |
| | | | | 713/100 |
| 2012/0312870 A1* | 12/2012 | Ma | ........................ | G07F 19/209 |
| | | | | 235/379 |
| 2013/0155081 A1* | 6/2013 | Khodorkovsky | ....... | G06F 1/329 |
| | | | | 345/522 |
| 2013/0261825 A1* | 10/2013 | Han | .......................... | G06F 1/26 |
| | | | | 700/291 |
| 2014/0181544 A1* | 6/2014 | Breen | .................... | H02J 1/102 |
| | | | | 713/320 |
| 2014/0215241 A1* | 7/2014 | Yoon | ..................... | G06F 1/3275 |
| | | | | 713/320 |
| 2015/0160274 A1* | 6/2015 | Obara | .................. | G01R 21/133 |
| | | | | 702/61 |
| 2015/0269112 A1* | 9/2015 | Hsueh | ..................... | G06F 1/189 |
| | | | | 710/105 |
| 2017/0083382 A1* | 3/2017 | LeBeane | .............. | G06F 1/3293 |
| 2017/0083383 A1* | 3/2017 | Rider | .................... | G06F 9/4893 |
| 2017/0256952 A1* | 9/2017 | Sugahara | ................ | H02J 3/004 |
| 2018/0165772 A1* | 6/2018 | Crawford | .............. | G06Q 50/06 |
| 2018/0173289 A1* | 6/2018 | Tosatti | .................. | G06F 1/3206 |
| 2018/0240201 A1* | 8/2018 | Eda | ......................... | G06Q 40/04 |
| 2018/0329477 A1* | 11/2018 | Goda | ..................... | G06F 3/067 |
| 2020/0185958 A1* | 6/2020 | Kim | ......................... | F24F 11/47 |
| 2020/0249737 A1* | 8/2020 | Nigam | ..................... | G08B 7/06 |
| 2021/0247838 A1* | 8/2021 | Bang | ..................... | G06N 3/063 |
| 2022/0083115 A1* | 3/2022 | Kwon | ....................... | G06F 1/06 |
| 2022/0374063 A1* | 11/2022 | Ma | .......................... | G06F 1/206 |
| 2023/0205606 A1* | 6/2023 | Palermo | ............... | G06F 9/5072 |
| | | | | 718/104 |
| 2023/0207003 A1* | 6/2023 | Chang | ............... | G11C 13/0033 |
| | | | | 365/163 |
| 2023/0217253 A1* | 7/2023 | Palermo | ............. | H04W 12/125 |
| | | | | 726/23 |
| 2024/0211019 A1* | 6/2024 | Oreifej | .................... | G06F 1/324 |
| 2024/0233780 A1* | 7/2024 | Choi | ........................ | G11C 5/14 |
| 2024/0388100 A1 | 11/2024 | Wong | | |
| 2024/0422577 A1* | 12/2024 | Mitra | ................... | H04W 24/02 |

* cited by examiner

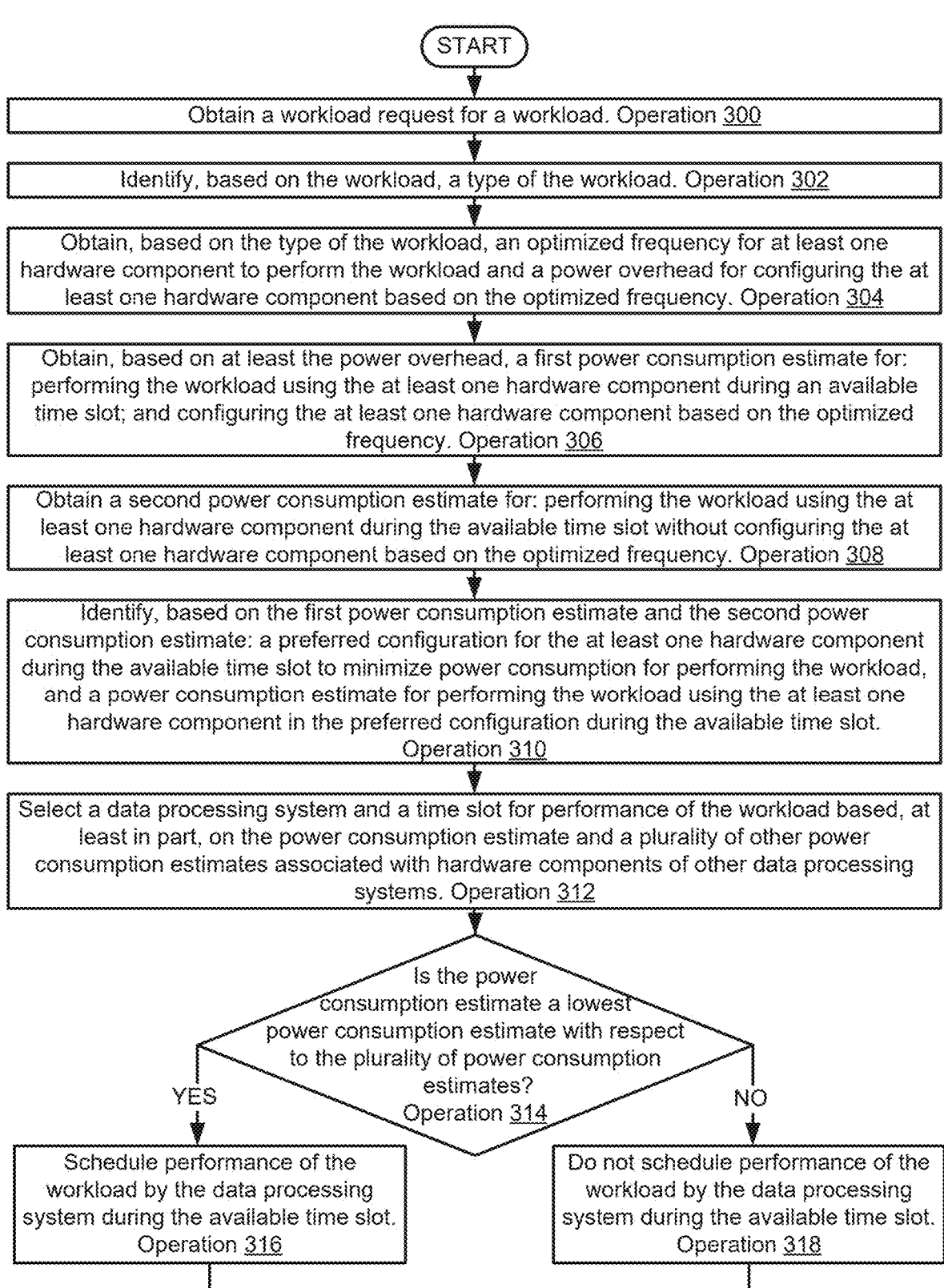

START

Obtain a workload request for a workload. Operation 300

Identify, based on the workload, a type of the workload. Operation 302

Obtain, based on the type of the workload, an optimized frequency for at least one hardware component to perform the workload and a power overhead for configuring the at least one hardware component based on the optimized frequency. Operation 304

Obtain, based on at least the power overhead, a first power consumption estimate for: performing the workload using the at least one hardware component during an available time slot; and configuring the at least one hardware component based on the optimized frequency. Operation 306

Obtain a second power consumption estimate for: performing the workload using the at least one hardware component during the available time slot without configuring the at least one hardware component based on the optimized frequency. Operation 308

Identify, based on the first power consumption estimate and the second power consumption estimate: a preferred configuration for the at least one hardware component during the available time slot to minimize power consumption for performing the workload, and a power consumption estimate for performing the workload using the at least one hardware component in the preferred configuration during the available time slot. Operation 310

Select a data processing system and a time slot for performance of the workload based, at least in part, on the power consumption estimate and a plurality of other power consumption estimates associated with hardware components of other data processing systems. Operation 312

Is the power consumption estimate a lowest power consumption estimate with respect to the plurality of power consumption estimates? Operation 314

YES                                        NO

Schedule performance of the workload by the data processing system during the available time slot. Operation 316

Do not schedule performance of the workload by the data processing system during the available time slot. Operation 318

FIG. 3

END

MINIMIZING POWER CONSUMPTION FOR PERFORMING A WORKLOAD

FIELD

Embodiments disclosed herein relate generally to managing a data processing system. More particularly, embodiments disclosed herein relate to systems and methods to minimize power consumption by a data processing system for performing a workload.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating methods of managing a data processing system in accordance with an embodiment.

DETAILED DESCRIPTION

Figure 1:
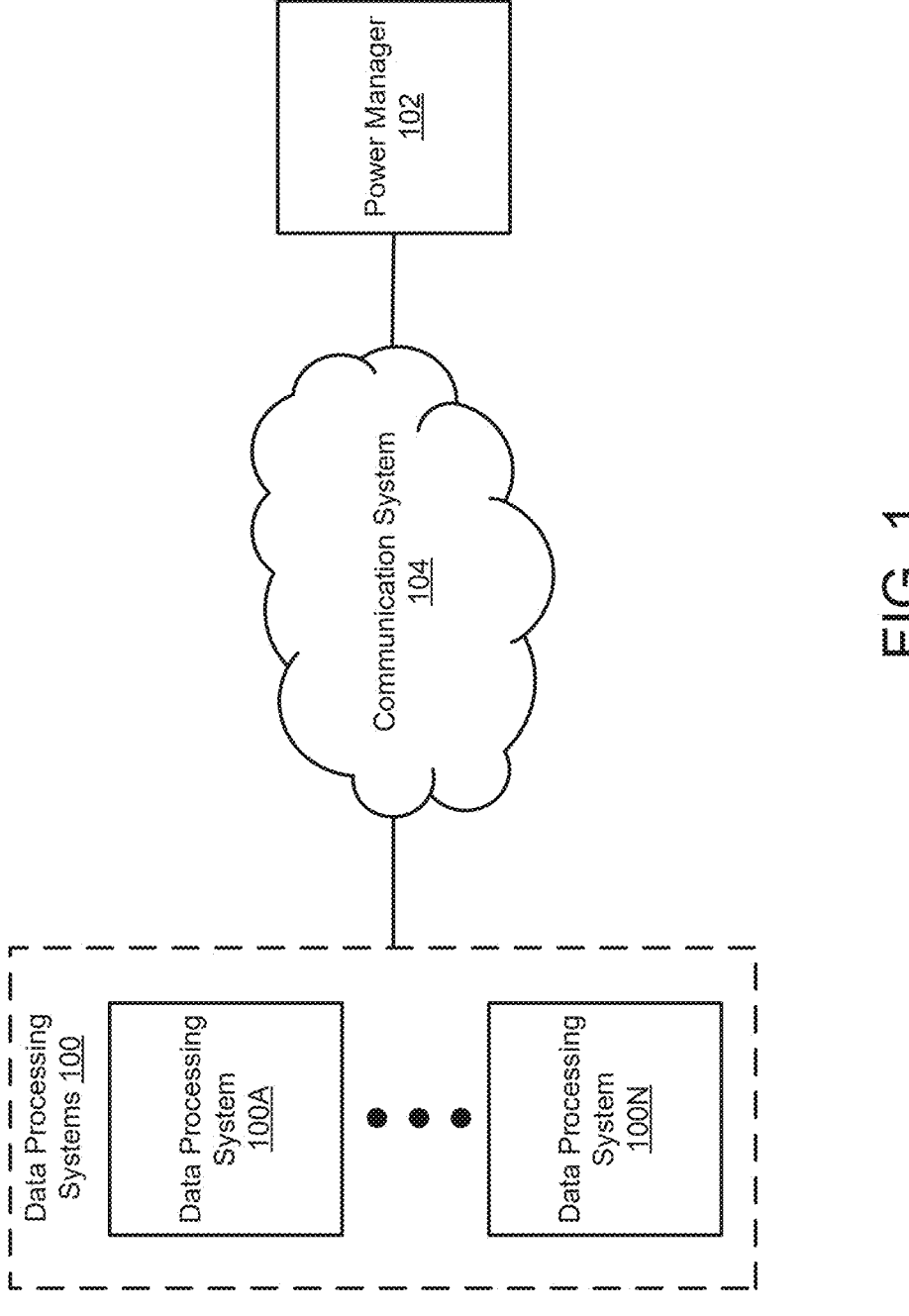
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing power consumption by a data processing system. To manage power consumption, the frequency at which a hardware component (e.g., a central processing unit (CPU), a graphics processing unit (GPU), an accelerated processing unit (APU)) operates may be optimized in order to reduce power consumption without negatively impacting computer-implemented services provided by the data processing system.

For example, a data processing system may include a CPU configured to operate at a high frequency setting in order to perform workloads in a time efficient manner. However, increased frequency may result in increased power consumption and increased heat production. As a result, operating costs may increase (e.g., due to power costs) and updates to the infrastructure may be necessary (e.g., to upgrade the cooling system). Thus, the computer-implemented services may be more expensive, and may be interrupted and/or delayed (e.g., due to downtime necessary to upgrade the cooling system).

To avoid increased operating costs and interruptions and/or delays in providing the computer-implemented services, the power consumption required to perform a workload may be reduced by optimizing the hardware component frequency. To optimize the hardware component frequency, test workloads may be performed at a plurality of frequencies and performance metrics may be obtained (e.g., a duration of time needed to perform the test workload, an average power consumption, a total power consumption). Using performance criteria and the performance metrics for the test workload at each frequency of the plurality of frequencies, an optimized frequency may be obtained and stored in an optimized frequency repository.

When a workload request is received for a workload, a type of the workload may be identified and used to perform a lookup in the optimized frequency repository to obtain the optimized frequency based on the type of the workload. A first power consumption estimate may be generated for an available time slot to perform the workload, which may include the amount of power to perform the workload in a configuration based on the optimized frequency, and an amount of power needed to configure the hardware component based on the optimized frequency (e.g., a power overhead). A second power consumption estimate may be generated for the available time slot, which may include the amount of power to perform the workload without configuring the hardware component based on the optimized frequency (e.g., performing the workload with the hardware component in the current configuration).

The first power consumption estimate and the second power consumption estimate for the available time slot may be compared, and a preferred configuration for the hardware component may be selected which minimizes the power consumption. Power consumption estimates may be obtained for any number of available time slots on any number of data processing systems, and a lowest power consumption estimate may be selected. Based on the selected lowest power consumption estimate, performance of the workload may be scheduled.

Thus, embodiments disclosed herein may address, among other technical problems, the technical challenge of performing a workload with limited availability of energy and/or high energy costs. By optimizing the operating frequency of a hardware component used to perform the workload, power consumption may be reduced while meeting performance criteria of the hardware component. Generating a plurality of power consumption estimates for performing the workload in an optimized frequency configuration and a current configuration for available time slots may allow for a lowest power consumption estimate to be identified. Using the lowest power consumption estimate, the workload may be scheduled to be performed in a manner which utilizes resources efficiently while providing the computer-implemented services.

In an embodiment, a method for managing a data processing system is disclosed. The method may include: obtaining a workload request for a workload; identifying, based on the workload, a type of the workload; obtaining, based on the type of the workload, an optimized frequency for at least one hardware component of the data processing system to perform the workload and a power overhead for configuring the at least one hardware component based on the optimized frequency; obtaining, based on at least the power overhead, a first power consumption estimate for: performing the workload using the at least one hardware component during an available time slot, and configuring the at least one hardware component based on the optimized frequency; obtaining a second power consumption estimate for: performing the workload using the at least one hardware component during the available time slot without configuring the at least one hardware component based on the optimized frequency; identifying, based on the first power consumption estimate and the second power consumption estimate: a preferred configuration for the at least one hardware component during the available time slot to minimize power consumption for performing the workload, and a power consumption estimate for performing the workload using the at least one hardware component in the preferred configuration during the available time slot; selecting a data processing system and a time slot for performance of the workload based, at least in part, on the power consumption estimate and a plurality of other power consumption estimates associated with hardware components of other data processing systems; and in an instance in which the power consumption estimate is a lowest power consumption estimate with respect to the plurality of power consumption estimates: scheduling performance of the workload by the data processing system during the available time slot.

Obtaining the optimized frequency for the at least one hardware component to perform the workload may include performing a lookup in an optimized frequency repository.

The method may also include, prior to obtaining the workload request: obtaining test data, the test data usable to perform a test workload by the at least one hardware component; performing, using the test data and by the at least one hardware component, the test workload at a plurality of frequencies; obtaining, based on the test workload at the plurality of frequencies, performance metrics for the test workload at each frequency of the plurality of frequencies; identifying, based on the performance metrics and performance criteria, the optimized frequency for the at least one hardware component; and storing the optimized frequency in an optimized frequency repository.

The performance metrics may include at least one performance metric selected from a group consisting of: a duration of time needed to perform the test workload; an average power consumption over the duration of time; and a total power consumption to perform the test workload.

The performance criteria may include at least one criterion selected from a group consisting of: a maximum duration of time over which the test workload is to be performed; an acceptable range for average power consumption; and a maximum total power consumption needed to perform the test workload.

The power overhead for configuring the at least one hardware component based on the optimized frequency may include an amount of power needed to configure the at least one hardware component from a previous configuration to a configuration based on the optimized frequency.

The first power consumption estimate may include a sum of the power consumption for performing the workload using the at least one hardware component during the available time slot and the power overhead for configuring the at least one hardware component based on the optimized frequency.

The second power consumption estimate for performing the workload using the at least one hardware component during the available time slot without configuring the at least one hardware component based on the optimized frequency may be higher than a portion of the first power consumption estimate for performing the workload using the at least one hardware component during the available time slot with configuring the at least one hardware component based on the optimized frequency when the preferred configuration is a configuration based on the optimized frequency.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide for management of data processing systems that may provide, at least in part, computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device. The computer-implemented services may be provided by, for example, data processing systems 100, power manager 102, and/or any other type of devices (not shown in FIG. 1). Other types of computer-implemented services may be provided by the system shown in FIG. 1 without departing from embodiments disclosed herein.

The system may include any number and/or type of data processing systems 100 (e.g., 100A-100N). Data processing systems 100 may include any number of hardware components (e.g., processors, memory modules, storage devices, communications devices). The hardware components may support execution of any number and type of applications (e.g., software components). Changes in available functionalities of the hardware and/or software components may provide for various types of different computer-implemented services to be provided over time.

As part of providing the computer-implemented services, the hardware components of data processing systems 100 may perform workloads (e.g., execute jobs using the software components). The performance of the workloads by data processing systems 100 may be managed by, for example, power manager 102. To manage the performance of the workloads, power manager 102 may (i) receive workload requests, (ii) identify a data processing system (e.g., data processing system 100A) to perform the workload, (iii) identify a time slot for data processing system 100A to perform the workload, (iv) schedule the workload (e.g., queue the workload to be performed during the identified time slot and by the identified data processing system), and/or (v) perform other tasks in order to manage the performance of workloads by data processing systems 100.

In order to perform the workloads in a time efficient manner, the hardware components of data processing systems 100 may be configured to improve workload throughput. For example, a processor (e.g., a central processing unit (CPU), a graphics processing unit (GPU), an accelerated processing unit (APU)) hosted by data processing system 100A may be configured to operate at a high frequency setting (e.g., a high clock rate).

However, by increasing processor frequency, the power consumed by the processor may increase, and the heat generated by the processor may also increase. To accommodate the increased power consumption and heat generation, updates to the infrastructure may be necessary (e.g., to upgrade the cooling system), which may lead to system downtime (e.g., to make the upgrades) and increased costs (e.g., due to higher energy consumption) in providing the computer-implemented services. Additionally, workload performance may not scale linearly with increased processor frequency, which may result in higher operating costs with marginal performance improvement.

Thus, in configuring the hardware components of data processing systems 100 to increase workload throughput (e.g., by increasing processor frequency) while providing the computer-implemented services, resources may be used inefficiently, which may result in the computer-implemented services being delayed (e.g., due to system downtime while making infrastructure upgrades) and/or more expensive (e.g., due to inefficient power consumption).

In general, embodiments disclosed herein may provide methods, systems, and/or devices for managing power consumption of a data processing system. To manage power consumption, a configuration of the hardware component of the data processing system used to perform a workload during an available time slot may be selected to minimize power consumption, taking into account both the power consumed to perform the workload, and the power consumed to configure the hardware component to perform the workload.

To select a configuration for the hardware component during an available time slot, a workload request for a workload may be obtained and a type of the workload may be identified. An optimized frequency for at least one hardware component to perform the workload may be obtained (e.g., optimized using performance metrics and performance criteria). To perform the workload at the optimized frequency during an available time slot, however, the hardware component may need to be configured from a current configuration to an optimized configuration. In configuring the hardware component, additional power may be consumed (e.g., a power overhead). A first power consumption estimate may be obtained for performing the workload using the hardware component during the available time slot at the optimized frequency, which may be a sum of the power to perform the workload at the optimized frequency and the power overhead.

A second power consumption estimate may be obtained, which may include the power for performing the workload using the hardware component during the available time slot without changing the configuration of the hardware component. The second power consumption estimate may include performing the workload at a frequency that was not optimized. However, the second power consumption estimate may not include a power overhead due to performing the workload without configuring the hardware component.

Based on the first power consumption estimate and the second power consumption estimate, a preferred configuration for the hardware component may be identified for the available time slot to reduce power consumption. A plurality of power consumption estimates may be generated for any number of available time slots and/or data processing systems which may perform the workload. A data processing system and available time slot may be selected in which the power consumption estimate is a lowest power consumption estimate, and performance of the workload may be scheduled based on the selection.

By doing so, a system in accordance with an embodiment may increase the likelihood of performing a workload which reduces power consumption while optimizing performance of hardware components of a data processing system. Minimizing power consumption may allow for the computer-implemented services to be provided in a manner which utilizes resources efficiently (e.g., energy resources), while maintaining a level of quality of the computer-implemented services (e.g., by optimizing frequency using performance metrics and performance criteria).

To perform the above-noted functionality, the system of FIG. 1 may include data processing systems 100, and/or power manager 102. Data processing systems 100, power manager 102, and/or any other type of devices not shown in FIG. 1 may perform all, or a portion of the computer-implemented services independently and/or cooperatively. Each of these components is discussed below.

Data processing systems 100 may include any number and/or type of data processing systems (e.g., 100A-100N), which may each include any number of hardware components configured to perform workloads (e.g., execute jobs related to providing computer-implemented services). The workloads performed by data processing systems 100 may be managed by power manager 102.

Power manager 102 may include any number and/or type of devices (e.g., other data processing systems, servers, management systems, storage devices, user devices) that may provide computer-implemented services (e.g., power management services, workload scheduling services, device management services). To perform its functionality, power manager 102 may (i) obtain workload requests, the workload requests including workloads to be performed by data processing systems 100, (ii) identify a type of the workload, (iii) obtain an optimized frequency for a hardware component and/or power overhead (e.g., power to configure the hardware component into a configuration based on the optimized frequency) for performing the workload (e.g., reading the optimized frequency and/or power overhead from storage, generating the optimized frequency and/or power overhead), (iv) obtain a first power consumption estimate for performing the workload by a data processing system of data processing systems 100 during an available time slot (e.g., including the power to perform the workload in the optimized frequency configuration and the power overhead), (v) obtain a second power consumption estimate for performing the workload by a data processing system in the current configuration (e.g., including the power to perform the workload without changing the configuration based on the optimized frequency), (vi) identify a time slot and a data processing system to perform the workload with the lowest power consumption estimate (e.g., by comparing the first power consumption estimate and the second power consumption estimate), (vii) schedule the workload to be performed during the identified time slot and by the identified data processing system, and/or (viii) perform other tasks to provide power management services for data processing systems 100.

Thus, power management services for data processing systems 100 may be provided by power manager 102. By doing so, the power consumed by data processing systems 100 to perform workloads may be optimized without negatively impacting the performance of the workloads (e.g., by optimizing processor frequency). Optimization of power consumption may allow for data processing systems 100 to provide computer-implemented services in a manner that efficiently uses resources and reduces heat output during workload performance, which may result in computer-implemented services that are less expensive and less likely to be interrupted (e.g., due to downtime to upgrade the infrastructure).

Figure 2A:
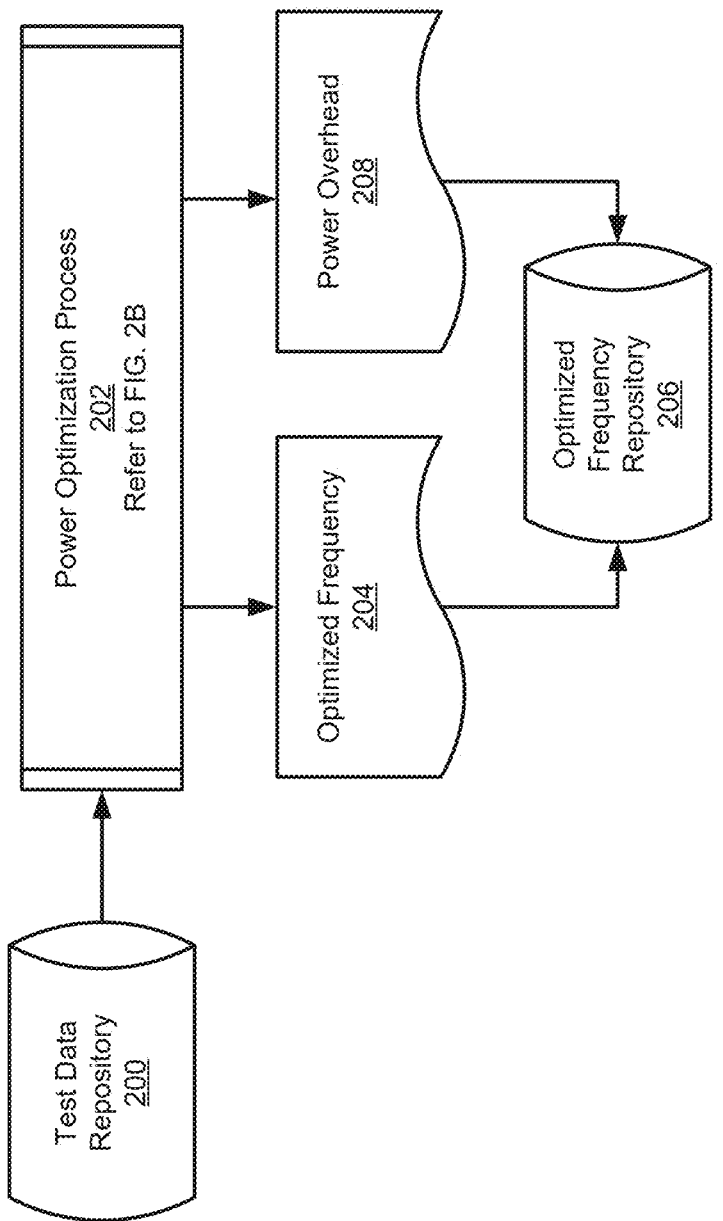
FIGS. 2A-2C show diagrams illustrating data flows in accordance with an embodiment.

When providing their functionality, any of data processing systems 100, and/or power manager 102 may perform all, or a portion, of the processes, interactions, and methods illustrated in FIGS. 2A-3.

Any of data processing systems 100 and/or power manager 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 104. Communication system 104 may facilitate communications between the components of FIG. 1. In an embodiment, communication system 104 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein. For example, while the system of FIG. 1 shows a single power manager (e.g., 102), it will be appreciated that the system may include any number of power managers.

Figure 2B:
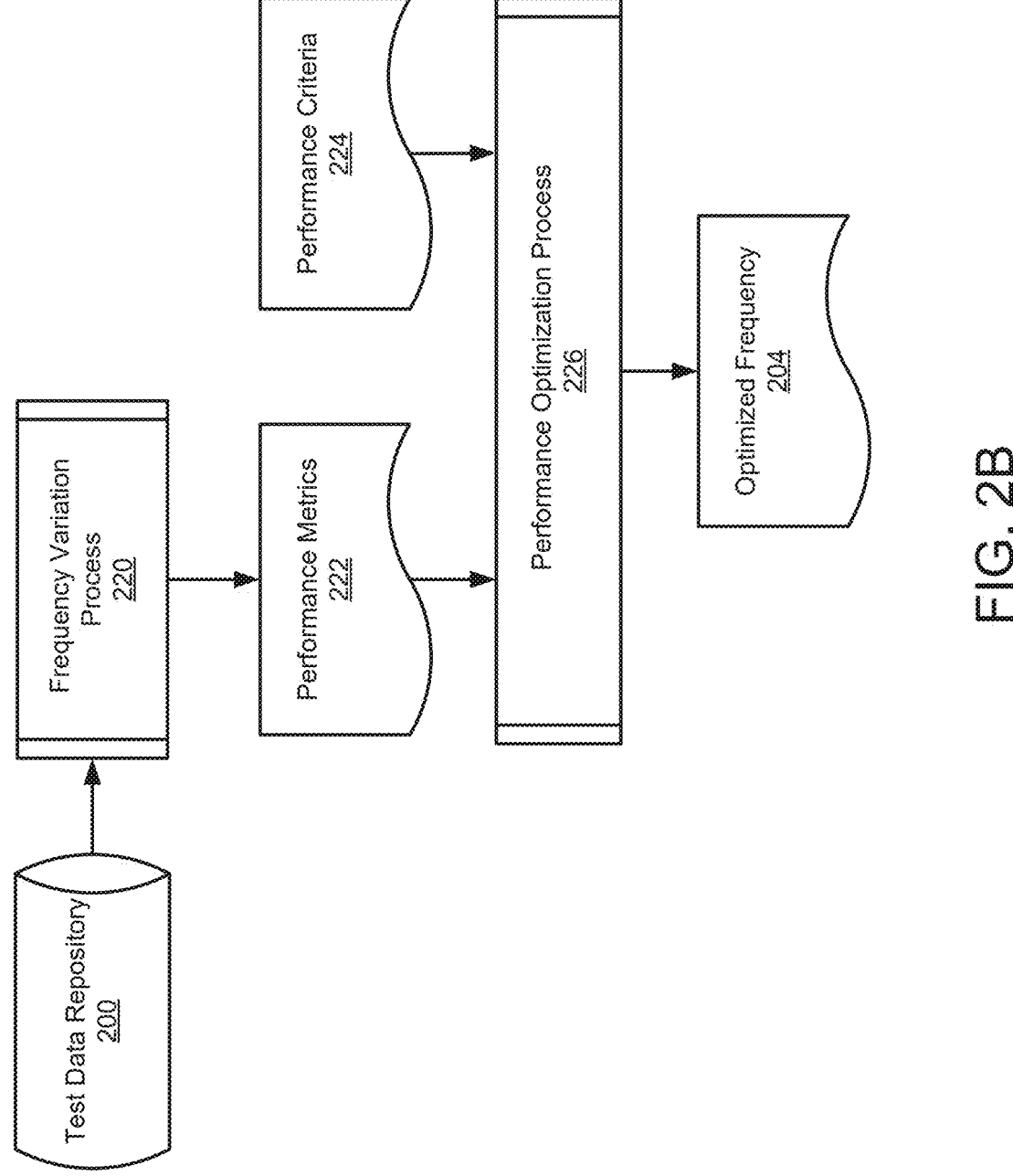
Figure 2C:
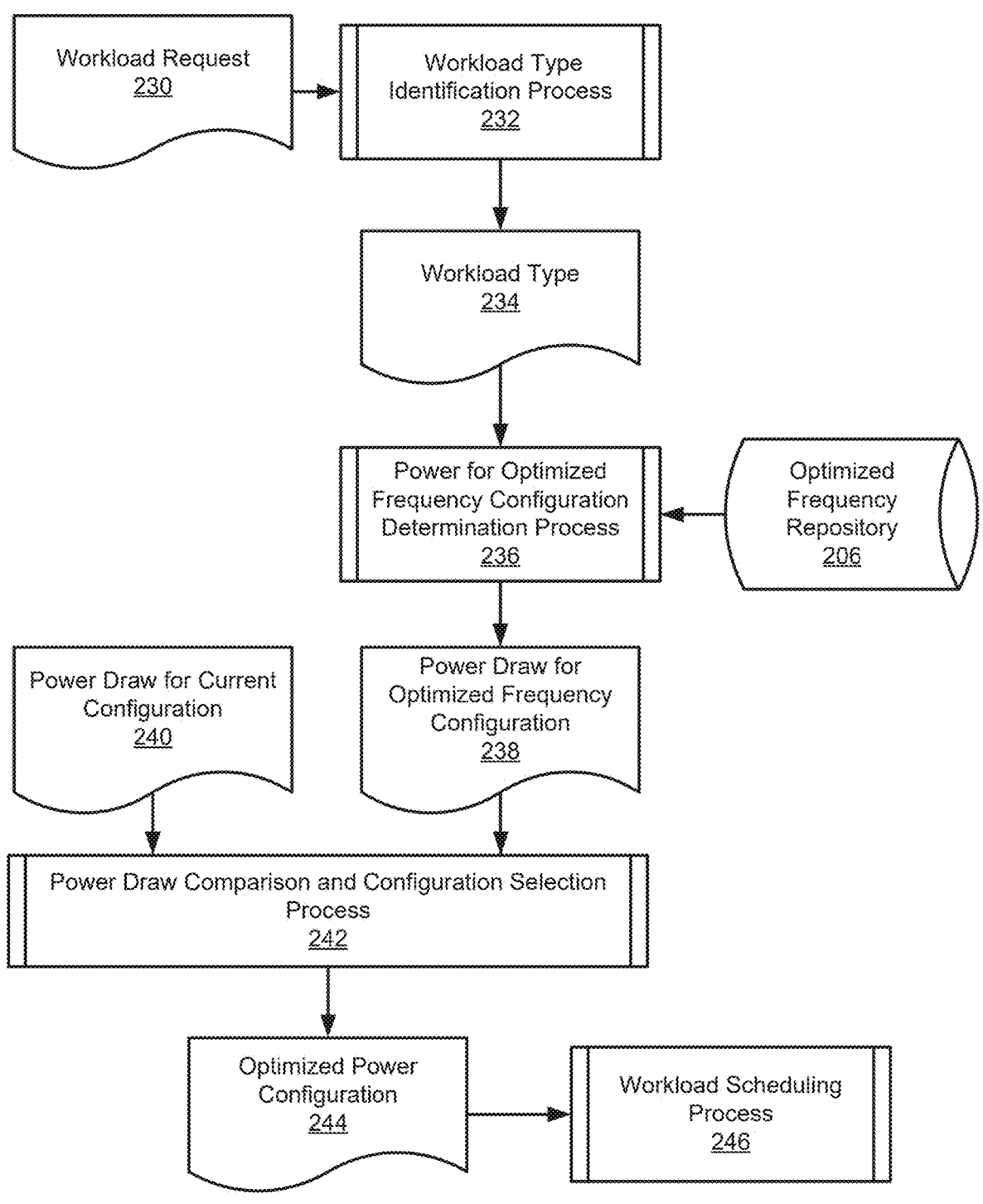

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 204, 208) is used to represent data structures, a second set of shapes (e.g., 202, 220) is used to represent processes performed using and/or that generate data, and a third set of shapes (e.g., 200, 206) is used to represent large scale data structures such as databases.

Turning to FIG. 2A, a first data flow diagram in accordance with an embodiment is shown. The first data flow diagram may illustrate data used in and data processing performed in generating an optimized frequency repository for various types of workloads and power overheads for configuring hardware components based on the optimized frequencies.

To generate an optimized frequency repository and power overheads based on the optimized frequencies, power optimization process 202 may be performed using test data from test data repository 200. Test data repository 200 may include any type of test data from any number of data sources, and the test data may be usable to perform any type and/or quantity of test workloads.

During power optimization process 202, the test data from test data repository 200 may be used to perform a test workload at various frequencies. Using performance metrics and performance criteria, the test workload at various frequencies may be evaluated to identify an optimized frequency (e.g., optimized frequency 204). Refer to FIG. 2B for additional details regarding processes used to optimize frequency for test workloads.

Additionally, during power optimization process 202 power overhead 208 may be obtained. Power overhead 208 may include the amount of power needed to configure a hardware component from a current configuration to a configuration based on optimized frequency 204. To obtain power overhead 208, power overhead 208 may be generated (e.g., by power manager 102) based optimized frequency 204. For example, optimized frequency 204 may indicate that the optimized frequency (e.g., the frequency with the lowest power consumption while meeting performance criteria) for a GPU of data processing system 100A is 1000 megahertz (MHz). An amount of power may be consumed to change the configuration of the GPU from a previous frequency (e.g., 1500 MHz) to the optimized frequency (e.g., power overhead 208). Power overhead 208 needed to configure the GPU from 1500 MHz to 1000 MHz may be calculated to be 0.2 kilowatt-hours (kWh) of power.

Once optimized frequency 204 and power overhead 208 have been obtained for the test workloads performed at various frequencies, they may be stored in optimized frequency repository 206. Optimized frequency repository 206 may include optimized frequencies and power overheads for any number of hardware components of data processing systems 100 to perform any type of workload and may be used by power manager 102 to calculate power consumption estimates. Refer to FIG. 2C for additional details regarding the use of optimized frequency repository 206.

Thus, by implementing the data flow shown in FIG. 2A, a system in accordance with embodiments disclosed herein may generate optimized frequencies for performing workloads by hardware components of data processing systems 100 and power overheads based on the optimized frequencies. The optimized frequencies and power overheads may be stored in an optimized frequency repository, which may be used by power manager 102 to generate power consumption estimates (refer to FIG. 2C).

Turning to FIG. 2B, a second data flow diagram in accordance with an embodiment is shown. The second data flow diagram may illustrate data used in and data processing performed in generating an optimized frequency for a hardware component to perform a workload (e.g., optimized frequency 204). FIG. 2B may be an expansion of power optimization process 202 shown in FIG. 2A.

To generate optimized frequency 204, test data from test data repository 200 may be used to perform frequency variation process 220. During frequency variation process 220, a test workload may be performed at various frequencies, and performance metrics may be obtained for each frequency (e.g., performance metrics 222). Performance metrics 222 (e.g., performance metrics for the test workload at each frequency) may include (i) a duration of time needed to perform the test workload, (ii) an average power consumption over the duration of time, (iii) a total power consumption to perform the test workload, and/or (iv) other performance metrics.

For example, a GPU may be used to perform an AI workload (e.g., training a large language model). To generate optimized frequency 204 for the AI workload, test data may be used to perform test AI workloads at various frequencies. The GPU may, for example, have a maximum frequency of 2000 MHz. The test workloads may then perform the AI workload at 20 frequencies ranging from 500 MHz to 2000 MHz and collect performance metrics 222 for each of the 20 frequencies.

Performance metrics 222 may then be used to perform performance optimization process 226. During performance optimization process 226, performance metrics 222 for each test workload may be compared to performance criteria 224. Performance criteria 224 may include (i) a maximum duration of time over which the workload is to be performed, (ii) an acceptable range for average power consumption, (iii) a maximum total power consumption needed to perform the workload, and/or (iv) other performance criteria.

Continuing with the above example, performance metrics 222 from the test AI workloads may be compared to performance criteria 224 during performance optimization process 226. Performance criteria 224 for AI workloads may indicate that performance of the AI workload must be completed within 24 hours, the average power consumption must range from 50 to 250 W, and the maximum power consumption must not exceed 5 kWh.

Based on performance criteria 224 and performance metrics 222, optimized frequency 204 may be identified. Optimized frequency 204 may include a frequency for a hardware component of the various frequencies used to perform the test workload which minimizes power consumption while meeting criteria indicated by performance criteria 224.

Continuing with the above example, performance metrics 222 for the 20 frequencies used to perform the test AI workload may be compared to performance criteria 224. While performing the workload at 2000 MHz (e.g., the maximum frequency) may result in the fastest time to workload completion, for example, 10 hours, it may also consume the most power, for example, 6 kWh. Alternatively, performing the workload at 500 MHZ (e.g., the lowest frequency tested) may result in the slowest time to workload completion, for example, 30 hours, which may lead to power consumption higher than a minimum power consumption, for example, 4 kWh. Performing the workload at the minimum frequency may result in power consumption higher than the minimum power consumption due to frequency independent processes which may consume power at a fixed rate. Thus, increasing time to workload completion may increase the power consumption of the frequency independent processes, regardless of frequency. By comparing performance metrics 222 for the 20 frequencies, it may be determined that the frequency which results in the minimum power consumption while meeting performance criteria 224 is 1500 MHZ, which may complete the workload in 22 hours, use an average power of 150 W, and consume a total of 3.3 kWh of power.

Thus, by implementing the data flow shown in FIG. 2B, a system in accordance with embodiments disclosed herein may be used to generate an optimized frequency for a hardware component of a data processing system to perform a workload. The optimized frequency may be generated by performing a test workload at various frequencies, and performance metrics may be obtained for each frequency. Based on the performance metrics and performance criteria, an optimized frequency may be identified which minimizes power consumption while meeting the performance criteria.

Turning to FIG. 2C, a third data flow diagram in accordance with an embodiment is shown. The third data flow diagram may illustrate data used in and data processing performed in scheduling a workload to be performed by a data processing system during an available time slot which reduces power consumption.

To schedule a workload to be performed which reduces power consumption, workload type identification process 232 may be performed. To perform workload type identification process 232, a workload request (e.g., workload request 230) for a workload may be obtained (e.g., received by power manager 102 from a user of data processing systems 100). Workload request 230 may be analyzed to identify a type of workload (e.g., workload type 234). Types of workloads may include (i) storage workloads (e.g., workloads regarding content management systems and/or databases), (ii) data workloads (e.g., workloads regarding processing and/or analyzing data including AI workloads and/or other machine learning workloads), (iii) Internet of things workloads (e.g., workloads regarding processing and/or analyzing data from sensors and/or other devices), and/or (iv) other types of workloads.

Workload type 234 may be used to perform power for optimized frequency configuration determination process 236. During power for optimized frequency configuration determination process 236, a lookup may be performed (e.g., by power manager 102) to obtain an optimized frequency for the type of workload to be performed from optimized frequency repository 206. Refer to FIG. 2B for additional details regarding determination of the optimized frequency. Additionally, a power overhead may also be obtained from optimized frequency repository 206, which may indicate the amount of power needed to configure a hardware component based on the optimized frequency during an available time slot.

For example, power manager 102 may obtain workload request 230 including a request to perform a workload using a machine learning model to forecast weather (e.g., a forecasting workload). Power manager 102 may identify the workload type, and perform a lookup in optimized frequency repository 206 to obtain the optimized frequency for performing the forecasting workload (e.g., 1000 MHz). Power manager 102 may also obtain the power overhead for configuring a hardware component to perform the forecasting workload at 1000 MHz during an available time slot (e.g., a first time slot) from optimized frequency repository 206. For example, during the first time slot the hardware component may be configured to operate at a frequency of 2000 MHz (e.g., the frequency used to perform a previous workload). To change the configuration of the hardware component to operate at a frequency of 1000 MHz to perform the forecasting workload, a power overhead of, for example, 0.1 kWh may be required.

Using the optimized frequency and the power overhead, a first power consumption estimate for performing the workload using the hardware component during the available time slot in the configuration based on the optimized frequency (e.g., power draw for optimized frequency configuration 238) may be obtained. The first power consumption estimate may include a sum of the power consumption for performing the workload using the hardware component during the available time slot in the configuration based on the optimized frequency and the power overhead.

Continuing with the above example, power draw for optimized frequency configuration 238 for the first time slot may be obtained for performing the forecasting workload at 1000 MHz (e.g., the optimized frequency). To obtain power draw for optimized frequency configuration 238, the power consumption for performing the forecasting workload at 1000 MHz (e.g., 1 kWh) may be added to the power overhead (e.g., 0.1 kWh) to obtain a sum of 1.1 kWh, the sum indicating the first power consumption estimate for performing the forecasting workload during the first time slot.

Any number of power draw for optimized frequency configuration 238 may be generated for performance of the workload for any number of available time slots using hardware components on any of data processing systems 100. For example, workload request 230 may include a deadline for performance of the workload (e.g., the workload must be completed within one week). Power manager 102 may identify multiple available time slots using data processing systems 100 which meet the deadline requirement. Each available time slot may be associated with hardware components with different configurations (e.g., based on the workload performed in the preceding time slot). Due to the differences in configurations, the power overhead for each time slot may vary, resulting in the generation of multiple power draw for optimized frequency configuration 238.

Continuing with the above example, the forecasting workload request may include a deadline indicating that the forecasting workload must be performed within 5 days. Power manager 102 may identify three available time slots which meet the deadline requirement: the first time slot (e.g., Monday using data processing system 100A), a second time slot (e.g., Tuesday using data processing system 100A), and a third time slot (e.g., Wednesday using data processing system 100B). A power overhead for configuring the hardware component to 1000 MHz may be obtained for each time slot, for example, 0.1 kWh for the first time slot, 0.05 kWh for the second time slot, and 0.7 kWh for the third time slot.

Power draw for optimized frequency configuration 238 (e.g., the first power estimate) for each available time slot may be used to perform power draw comparison and configuration selection process 242. During power draw comparison and configuration selection process 242, power draw for optimized frequency configuration 238 may be compared to power draw for current configuration 240 for each available time slot. Power draw for current configuration 240 may include a second power consumption estimate for performing the workload using the hardware component during the available time slot without configuring the hardware component based on the optimized frequency (e.g., performing the workload using the hardware component in the same configuration as the preceding time slot). Any number of power for current configuration 240 may be generated for performance of a workload for any number of available time slots using hardware components on any of data processing systems 100.

Continuing with the above example, a second power consumption estimate (e.g., power draw for current configuration 240) may be obtained for each of the three available time slots for performing the forecasting workload without configuring the hardware component. The hardware component may be configured to operate at a frequency of 700 MHz for the first time slot, 1100 MHz for the second time slot, and 1700 MHz for the third time slot. The second power consumption estimate for each of the time slots may include 1.5 kWh for the first time slot, 1.1 kWh for the second time slot, and 1.6 kWh for the third time slot.

Power draw for optimized frequency configuration 238 (e.g., the first power consumption estimate) for each available time slot may then be compared to power draw for current configuration 240 (e.g., the second power consumption estimate) for each available time slot to identify a preferred configuration (e.g., the optimized frequency configuration, the current configuration) for the hardware component during each available time slot. Power draw for optimized frequency configuration 238 and power draw for current configuration 240 for each time slot may be analyzed, and the preferred configuration may be identified which minimizes power consumption for performing the workload. A power consumption estimate for performing the workload using the hardware component in the preferred configuration during the available time slot may also be identified. Once a preferred configuration and power consumption estimate for the preferred configuration has been identified for each time slot, a data processing system, time slot, and configuration for performance of the workload may be selected (e.g., optimized power configuration 244).

Continuing with the above example, a preferred configuration may be selected for each of the available time slots to perform the forecasting workload which minimizes power consumption. For example, the preferred configurations may include: the optimized configuration for the first time slot (e.g., consuming 1.1 kWh of power), the optimized configuration for the second time slot (e.g., consuming 1.05 kWh of power), and the current configuration for the third time slot (e.g., consuming 1.6 kWh of power). The optimized configuration for the second time slot (e.g., Tuesday using data processing system 100A) may be identified as having the lowest power consumption estimate (e.g., optimized power configuration 244).

Once optimized power configuration 244 has been obtained (e.g., the preferred configuration using the data processing system and time slot which minimizes power consumption), workload scheduling process 246 may be performed. During workload scheduling process 246, the workload may be queued for performance during the selected time slot, using the selected data processing system, and using the hardware component in the identified preferred configuration (e.g., the frequency which minimizes power consumption).

Thus, via the processes illustrated in FIG. 2C, a system in accordance with an embodiment may schedule a workload to be performed by a data processing system using a hardware component in a preferred configuration during an available time slot which reduces power consumption. The preferred configuration may be selected by comparing a power consumption estimate for the optimized frequency configuration (e.g., including the power to perform the workload in the optimized frequency configuration and the power overhead for configuring the hardware component) to a power consumption estimate for the current configuration (e.g., including the power to perform the workload without changing the configuration of the hardware component) during an available time slot. By comparing the power consumption estimates for the preferred configuration for various available time slots and/or data processing systems, a lowest power consumption estimate may be selected, and the workload may be scheduled based on the lowest power consumption estimate.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1-2C may perform various methods to manage power consumption of a data processing system. FIG. 3 illustrates a method that may be performed by the components of the system of FIGS. 1-2C. In the diagram discussed below and shown in FIG. 3, any of the operations may be repeated, performed in different orders, and/or performed in parallel with or in a partially overlapping in time manner with other operations. The method described with respect to FIG. 3 may be performed by a data processing system, any component of a data processing system, and/or another device.

Turning to FIG. 3, a flow diagram illustrating a method of managing a data processing system in accordance with an embodiment is shown. The method may be performed, for example, by any of the components of the system of FIG. 1, and/or any other entity without departing from embodiments disclosed herein.

At operation 300, a workload request for a workload may be obtained. Obtaining the workload request may include (i) receiving the workload request via a message, (ii) reading the workload request from storage, (iii) generating the workload request (e.g., identifying a workload to be performed), and/or (iv) other methods.

At operation 302, a type of the workload may be identified based on the workload. Identifying the type of the workload may include (i) identifying a characteristic of the workload, (ii) obtaining a rule set, the rule set keyed to characteristics of workloads usable to distinguish types of workloads, (iii) parsing the rule set to determine which rule applies, (iv) selecting a rule from the rule set to determine the type of the workload, and/or (v) other methods.

At operation 304, an optimized frequency for at least one hardware component to perform the workload and a power overhead for configuring the at least one hardware component based on the optimized frequency may be obtained based on the type of the workload. Obtaining the optimized frequency and the power overhead may include (i) performing a lookup in an optimized frequency repository (e.g., searching the optimized frequency repository for the optimized frequency and power overhead associated with the type of workload), (ii) obtaining test data, the test data usable to perform a test workload by the at least one hardware component (e.g., reading test data from storage, receiving test data from another device), (iii) performing, using the test data and by the at least one hardware component, the test workload at a plurality of frequencies (e.g., selecting a range of frequencies to perform the test workload, performing the test workload at each frequency in the range of frequencies), (iv) obtaining, based on the test workload at the plurality of frequencies, performance metrics for the test workload at each frequency of the plurality of frequencies (e.g., measuring the duration of time needed to perform the test workload, measuring the average power consumption over the duration of time, measuring the total power consumption), (v) identifying, based on the performance metrics and performance criteria, the optimized frequency for the at least one hardware component (e.g., obtaining performance criteria, comparing a quantity from the performance metrics to a quantity indicated by the performance criteria), (vi) storing the optimized frequency in an optimized frequency repository (e.g., saving the optimized frequency in a memory module of the data processing system, providing the optimized frequency to another device responsible for storing the optimized frequencies), and/or (vii) other methods.

At operation 306, a first power consumption estimate may be obtained, based on at least the power overhead, for: performing the workload using the at least one hardware component during an available time slot, and configuring the at least one hardware component based on the optimized frequency. Obtaining the first power consumption estimate may include (i) obtaining an amount of power needed perform the workload in the configuration based on the optimized frequency (e.g., calculating the amount of power, performing a lookup in a database to determine the amount of power), (ii) obtaining an amount of power needed to configure the at least one hardware component from a previous configuration to a configuration based on the optimized frequency (e.g., calculating the amount of power, performing a lookup in a database to determine the amount of power), (iii) adding the amount of power needed to perform the workload in the configuration based on the optimized frequency to the amount of power needed to configure the at least one hardware component to obtain a sum, and/or (iv) other methods.

At operation 308, a second power consumption estimate may be obtained for: performing the workload using the at least one hardware component during an available time slot without configuring the at least one hardware component based on the optimized frequency. Obtaining the second power consumption estimate may include (i) calculating the amount of power needed to perform the workload without configuring the at least one hardware component, (ii) performing a lookup in a database to determine the amount of power needed to perform the workload without configuring the at least one hardware component, and/or (iii) other methods.

At operation 310, based on the first power consumption estimate and the second power consumption estimate, a preferred configuration for the at least one hardware component during the available time slot to minimize power consumption for performing the workload may be identified, and a power consumption estimate for performing the workload using the at least one hardware component in the preferred configuration during the available time slot may be identified. Identifying the preferred configuration and the power consumption estimate for performing the workload in the preferred configuration may include (i) comparing the first power consumption estimate and the second power consumption estimate to determine which is the lowest power consumption estimate, (ii) selecting the configuration which corresponds to the lowest power consumption estimate, and/or (iii) other methods.

At operation 312, a data processing system and a time slot for performance of the workload may be selected based, at least in part, on the power consumption estimate and a plurality of other power consumption estimates associated with hardware components of other data processing systems. Selecting the data processing system and the time slot for performance of the workload may include (i) obtaining a plurality of power consumption estimates for preferred configurations during available time slots using data processing systems, (ii) comparing the power consumption estimates to determine a lowest power consumption estimate, (iii) selecting the data processing system and the time slot for performance of the workload which corresponds with the lowest power consumption estimate, and/or (iv) other methods.

At operation 314, it may be determined whether the power consumption estimate is a lowest power consumption estimate with respect to the plurality of power consumption estimates. Determining whether the power consumption estimate is the lowest power consumption estimate may include (i) analyzing the plurality of power consumption estimates to ascertain whether the power consumption estimate the lowest power consumption estimate, (ii) providing the plurality of power consumption estimates to another device to determine if the power consumption estimate is the lowest power consumption estimate, and/or (iii) other methods.

If it is determined that the power consumption estimate is a lowest power consumption estimate with respect to the plurality of power consumption estimates (e.g., the determination is "Yes" at operation 314), then the method may proceed to operation 316.

At operation 316, performance of the workload by the data processing system during the available time slot may be scheduled. Scheduling the workload may include (i) queueing the workload to be performed by the data processing system during the available time slot, (ii) providing the workload to another device responsible for scheduling the workload to be performed by the data processing system during the available time slot, and/or (iii) other methods.

The method may end following operation 316.

Returning to operation 314, if it is determined that the power consumption estimate is not a lowest power consumption estimate with respect to the plurality of power consumption estimates (e.g., the determination is "No" at operation 314), then the method may proceed to operation 318.

At operation 318, performance of the workload by the data processing system during the available time slot may not be scheduled. Not scheduling the workload may include (i) not queueing the workload to be performed by the data processing system during the available time slot, (ii) selecting a different time slot and data processing system to perform the workload in which the power consumption estimate is the lowest power consumption estimate, and/or (iii) other methods.

The method may end following operation 318.

Thus, using the methods illustrated in FIG. 3, embodiments disclosed herein may provide systems and methods usable to manage power consumption of a data processing system to minimize the power consumed to perform a workload.

Figure 4:
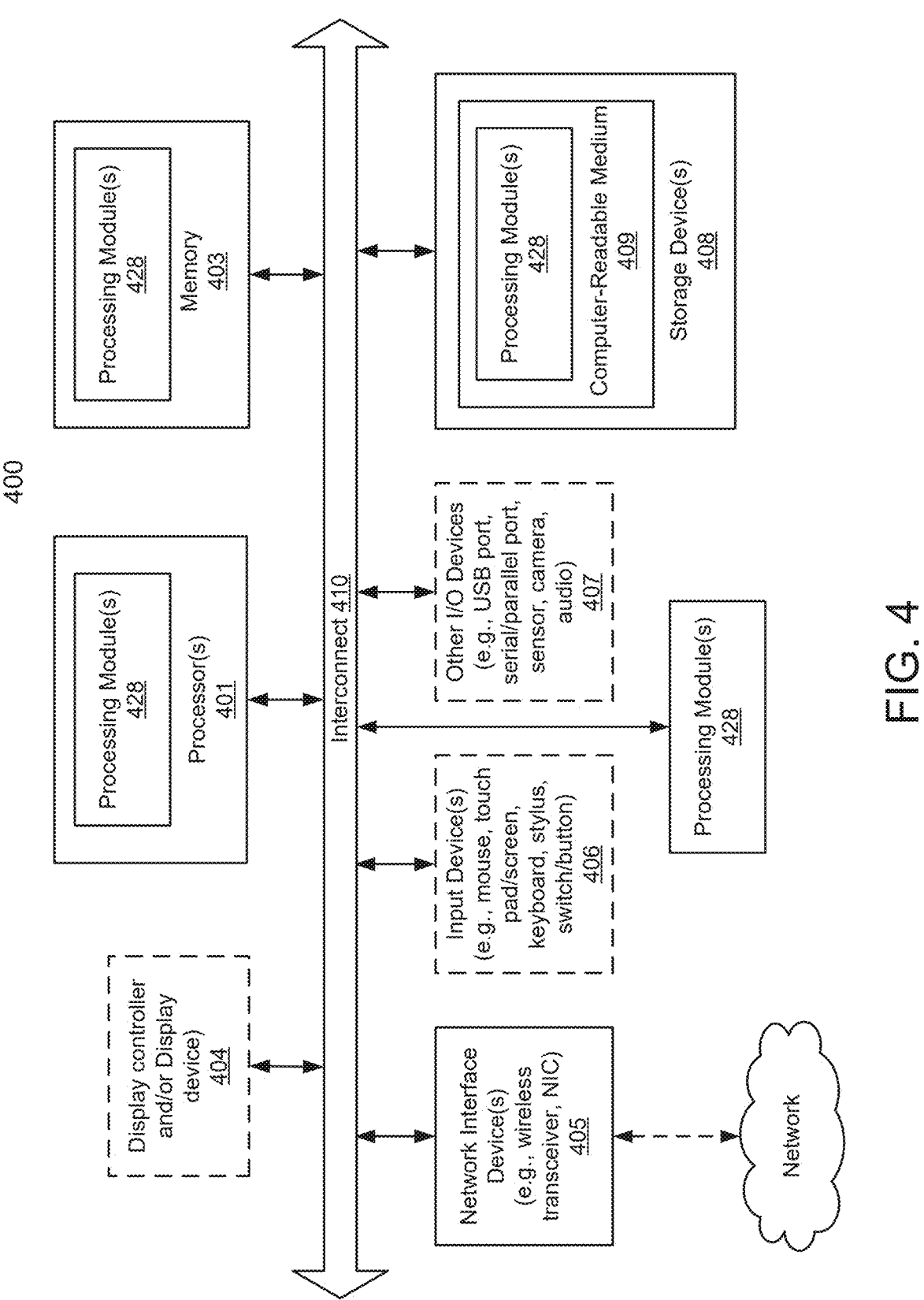
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of data processing systems, the method comprising:
  obtaining a workload request for a workload;
  identifying, based on the workload, a type of the workload;
  obtaining, based on the type of the workload:
    an optimized frequency for at least one hardware component of the data processing system to perform the workload; and
    a power overhead consisting of an amount of power for configuring the at least one hardware component from a current configuration to the optimized frequency;
  obtaining, based on at least the power overhead, a first power consumption estimate for:

performing the workload using the at least one hardware component during an available time slot, and
    configuring the at least one hardware component from the current configuration to the optimized frequency;
  obtaining a second power consumption estimate for:
    performing the workload using the at least one hardware component during the available time slot without configuring the at least one hardware component from the current configuration to the optimized frequency;
  identifying, based on the first power consumption estimate and the second power consumption estimate:
    a preferred configuration for the at least one hardware component during the available time slot to minimize power consumption for performing the workload, and
    a power consumption estimate for performing the workload using the at least one hardware component in the preferred configuration during the available time slot;
  selecting a data processing system of the data processing systems and a time slot for performance of the workload based, at least in part, on the power consumption estimate and a plurality of other power consumption estimates associated with hardware components of other data processing systems of the data processing systems; and
  in an instance of the selecting in which the power consumption estimate is a lowest power consumption estimate with respect to the plurality of other power consumption estimates:
    scheduling performance of the workload by the data processing system during the time slot for performance.

2. The method of claim 1, wherein obtaining the optimized frequency for the at least one hardware component to perform the workload comprises performing a lookup in an optimized frequency repository.

3. The method of claim 1, further comprising:
  prior to obtaining the workload request:
    obtaining test data, the test data usable to perform a test workload by the at least one hardware component;
    performing, using the test data and by the at least one hardware component, the test workload at a plurality of frequencies;
    obtaining, based on the test workload at the plurality of frequencies, performance metrics for the test workload at each frequency of the plurality of frequencies;
    identifying, based on the performance metrics and performance criteria, the optimized frequency for the at least one hardware component; and
    storing the optimized frequency in an optimized frequency repository.

4. The method of claim 3, wherein the performance metrics comprise at least one performance metric selected from a group consisting of:
  a duration of time needed to perform the test workload;
  an average power consumption over the duration of time; and
  a total power consumption to perform the test workload.

5. The method of claim 3, wherein the performance criteria comprise at least one criterion selected from a group consisting of:
  a maximum duration of time over which the test workload is to be performed;
  an acceptable range for average power consumption; and a maximum total power consumption needed to perform the test workload.

6. The method of claim 1, wherein the first power consumption estimate comprises a sum of the power consumption for performing the workload using the at least one hardware component during the available time slot and the power overhead for configuring the at least one hardware component from the current configuration to the optimized frequency.

7. The method of claim 1, wherein the second power consumption estimate for performing the workload using the at least one hardware component during the available time slot without configuring the at least one hardware component based on the optimized frequency is higher than a portion of the first power consumption estimate for performing the workload using the at least one hardware component during the available time slot with configuring the at least one hardware component based on the optimized frequency when the preferred configuration is a configuration based on the optimized frequency.

8. A non-transitory machine-readable medium having instructions stored therein, which when executed by a processor, cause the processor to perform operations for managing operation of data processing systems, the operations comprising:

obtaining a workload request for a workload;

identifying, based on the workload, a type of the workload;

obtaining, based on the type of the workload;

an optimized frequency for at least one hardware component of the data processing system to perform the workload; and a power overhead consisting of an amount of power for configuring the at least one hardware component from a current configuration to the optimized frequency;

obtaining, based on at least the power overhead, a first power consumption estimate for:

performing the workload using the at least one hardware component during an available time slot, and configuring the at least one hardware component from the current configuration to the optimized frequency;

obtaining a second power consumption estimate for:

performing the workload using the at least one hardware component during the available time slot without configuring the at least one hardware component from the current configuration to the optimized frequency;

identifying, based on the first power consumption estimate and the second power consumption estimate:

a preferred configuration for the at least one hardware component during the available time slot to minimize power consumption for performing the workload, and a power consumption estimate for performing the workload using the at least one hardware component in the preferred configuration during the available time slot;

selecting a data processing system of the data processing systems and a time slot for performance of the workload based, at least in part, on the power consumption estimate and a plurality of other power consumption estimates associated with hardware components of other data processing systems of the data processing systems; and in an instance of the selecting in which the power consumption estimate is a lowest power consumption estimate with respect to the plurality of other power consumption estimates:

scheduling performance of the workload by the data processing system during the time slot for performance.

9. The non-transitory machine-readable medium of claim 8, wherein obtaining the optimized frequency for the at least one hardware component to perform the workload comprises performing a lookup in an optimized frequency repository.

10. The non-transitory machine-readable medium of claim 8, further comprising:

prior to obtaining the workload request:

obtaining test data, the test data usable to perform a test workload by the at least one hardware component;

performing, using the test data and by the at least one hardware component, the test workload at a plurality of frequencies;

obtaining, based on the test workload at the plurality of frequencies, performance metrics for the test workload at each frequency of the plurality of frequencies;

identifying, based on the performance metrics and performance criteria, the optimized frequency for the at least one hardware component; and storing the optimized frequency in an optimized frequency repository.

11. The non-transitory machine-readable medium of claim 10, wherein the performance metrics comprise at least one performance metric selected from a group consisting of:

a duration of time needed to perform the test workload;

an average power consumption over the duration of time; and a total power consumption to perform the test workload.

12. The non-transitory machine-readable medium of claim 10, wherein the performance criteria comprise at least one criterion selected from a group consisting of:

a maximum duration of time over which the test workload is to be performed;

an acceptable range for average power consumption; and a maximum total power consumption needed to perform the test workload.

13. The non-transitory machine-readable medium of claim 8, wherein the first power consumption estimate comprises a sum of the power consumption for performing the workload using the at least one hardware component during the available time slot and the power overhead for configuring the at least one hardware component from the current configuration to the optimized frequency.

14. The non-transitory machine-readable medium of claim 8, wherein the second power consumption estimate for performing the workload using the at least one hardware component during the available time slot without configuring the at least one hardware component based on the optimized frequency is higher than a portion of the first power consumption estimate for performing the workload using the at least one hardware component during the available time slot with configuring the at least one hardware component based on the optimized frequency when the preferred configuration is a configuration based on the optimized frequency.

15. A power manager, comprising:

a processor; and a memory coupled to the processor to store instructions, which when executed by the processor, cause the processor to perform operations for managing operation of data processing systems, the operations comprising:

obtaining a workload request for a workload;

identifying, based on the workload, a type of the workload;

obtaining, based on the type of the workload;

an optimized frequency for at least one hardware component of the data processing system to perform the workload; and a power overhead consisting of an amount of power for configuring the at least one hardware component from a current configuration to the optimized frequency;

obtaining, based on at least the power overhead, a first power consumption estimate for:

performing the workload using the at least one hardware component during an available time slot, and configuring the at least one hardware component from the current configuration to the optimized frequency;

obtaining a second power consumption estimate for:

performing the workload using the at least one hardware component during the available time slot without configuring the at least one hardware component from the current configuration to the optimized frequency;

identifying, based on the first power consumption estimate and the second power consumption estimate:

a preferred configuration for the at least one hardware component during the available time slot to minimize power consumption for performing the workload, and a power consumption estimate for performing the workload using the at least one hardware component in the preferred configuration during the available time slot;

selecting a data processing system of the data processing systems and a time slot for performance of the workload based, at least in part, on the power consumption estimate and a plurality of other power consumption estimates associated with hardware components of other data processing systems of the data processing systems; and in an instance of the selecting in which the power consumption estimate is a lowest power consumption estimate with respect to the plurality of other power consumption estimates:

scheduling performance of the workload by the data processing system during the time slot for performance.

16. The power manager of claim 15, wherein obtaining the optimized frequency for the at least one hardware component to perform the workload comprises performing a lookup in an optimized frequency repository.

17. The power manager of claim 15, further comprising:

prior to obtaining the workload request:

obtaining test data, the test data usable to perform a test workload by the at least one hardware component;

performing, using the test data and by the at least one hardware component, the test workload at a plurality of frequencies;

obtaining, based on the test workload at the plurality of frequencies, performance metrics for the test workload at each frequency of the plurality of frequencies;

identifying, based on the performance metrics and performance criteria, the optimized frequency for the at least one hardware component; and storing the optimized frequency in an optimized frequency repository.

18. The power manager of claim 17, wherein the performance metrics comprise at least one performance metric selected from a group consisting of:

a duration of time needed to perform the test workload;

an average power consumption over the duration of time; and a total power consumption to perform the test workload.

19. The power manager of claim 17, wherein the performance criteria comprise at least one criterion selected from a group consisting of:

a maximum duration of time over which the test workload is to be performed;

an acceptable range for average power consumption; and a maximum total power consumption needed to perform the test workload.

20. The power manager of claim 15, wherein the first power consumption estimate comprises a sum of the power consumption for performing the workload using the at least one hardware component during the available time slot and the power overhead for configuring the at least one hardware component from the current configuration to the optimized frequency.

* * * * *